Figure 1:
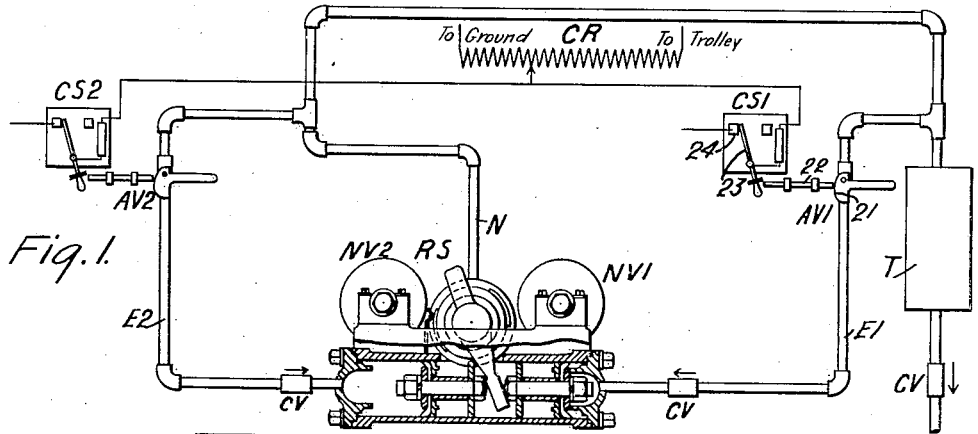

C. RENSHAW.
BRAKING SYSTEM.
APPLICATION FILED JULY 30, 1914.

1,286,760.

Patented Aug. 14, 1917.
2 SHEETS—SHEET 1.

WITNESSES:
Fred A. Lind
W. R. Coley

INVENTOR
Clarence Renshaw
BY
Wesley G. Karr
ATTORNEY

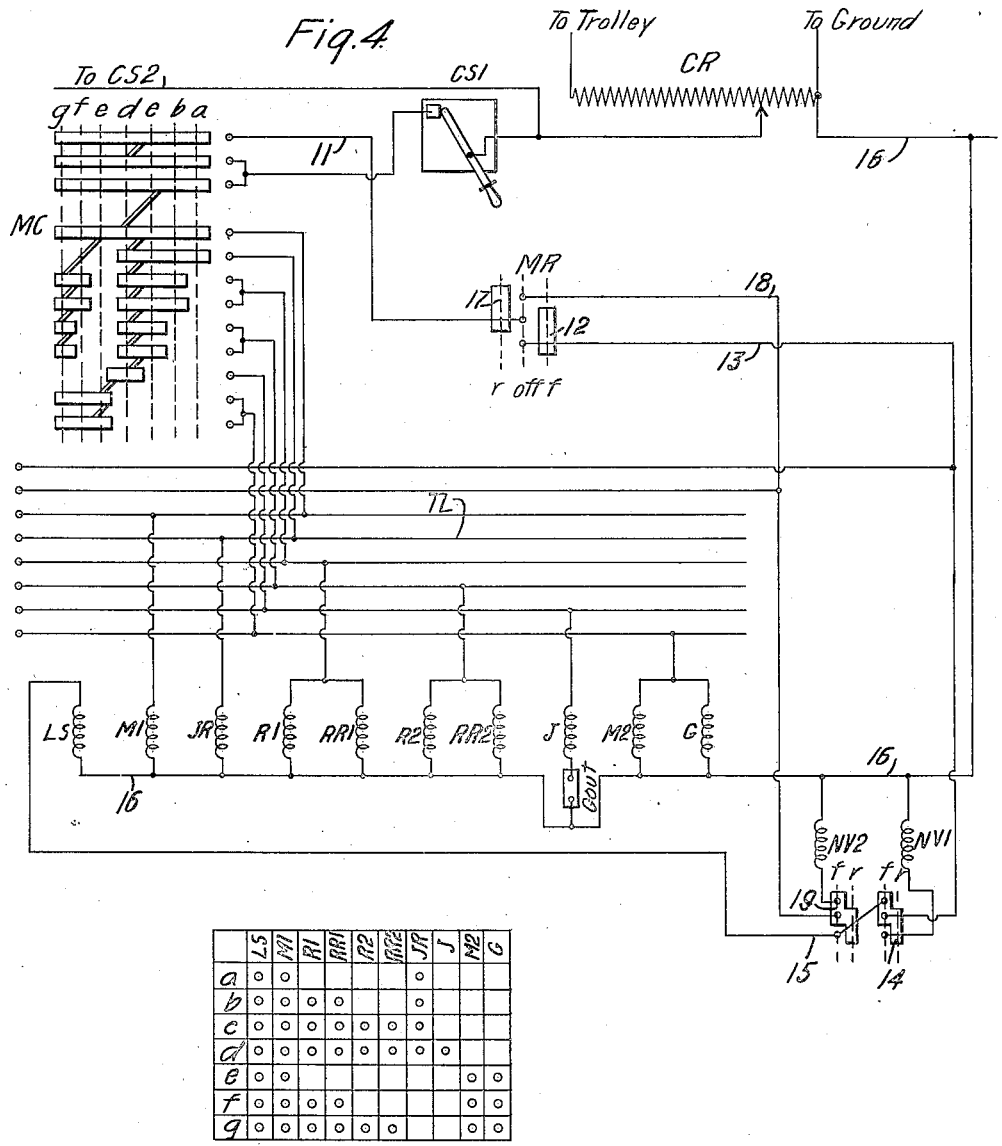

UNITED STATES PATENT OFFICE.

CLARENCE RENSHAW, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

BRAKING SYSTEM.

1,236,760.  Specification of Letters Patent.  Patented Aug. 14, 1917.

Application filed July 30, 1914. Serial No. 854,093.

*To all whom it may concern:*

Be it known that I, CLARENCE RENSHAW, a citizen of the United States, and a resident of Edgewood Park, in the county of Allegheny and State of Pennsylvania, have invented a new and useful Improvement in Braking Systems, of which the following is a specification.

My invention relates to systems of control for electric motors and it has special reference to auxiliary or emergency braking systems for electric railway vehicles and the like.

The object of my invention is to provide a simple, reliable and relatively inexpensive means independent of the regular braking apparatus whereby a vehicle may be reliably and effectively retarded and brought to a full stop in case derangement of the ordinary braking system renders it inadequate to meet the emergency.

In control systems of the class to which my invention is applicable, namely, those having one or more pairs of motors permanently connected in parallel-circuit relation, it is possible to set up dynamic braking by merely actuating the main circuit reverser to reverse the electrical relations of the field windings and armatures of the motors. With ordinary hand controlled systems, where the reverser is located within reach of the motorman and can thus be readily operated at any time, this practice is followed to a considerable extent in obtaining emergency braking. In power-operated control systems, where the reverser is operated indirectly, it is also followed if circumstances permit. Where supply-circuit voltage is used as the normal means of controlling or operating the reverser in systems of the latter sort, however, the voltage may sometimes fail and thus prevent the operation of the reverser at the very time when emergency braking is desired. It is to meet contingencies of this kind by providing an additional means of operating the reverser under such conditions, that my invention is designed.

According to my present invention, I provide auxiliary power-controlling, preferably fluid-pressure controlling, means, operative from the respective ends of the vehicle for moving the reverser to obtain braking action. In operating the reverser under normal conditions, the circuits are interlocked in such manner that the reverser cannot be moved while the motors are using power, in accordance with customary practice. To obtain quick action, the means which I provide for operating the reverser to obtain dynamic braking under emergency conditions are independent of the interlocks referred to, but I secure the same protection by mechanically connecting the handle of an auxiliary operating valve to that of the auxiliary control switch in such manner that the latter will be opened and power will be cut off from all of the motors of the car or train before the reverser will be thrown. Dynamic braking is thus immediately set up, and the vehicle is readily stopped or maintained at a safe speed in case it is traveling down a grade, even when the supply-circuit voltage has failed.

Figure 2:
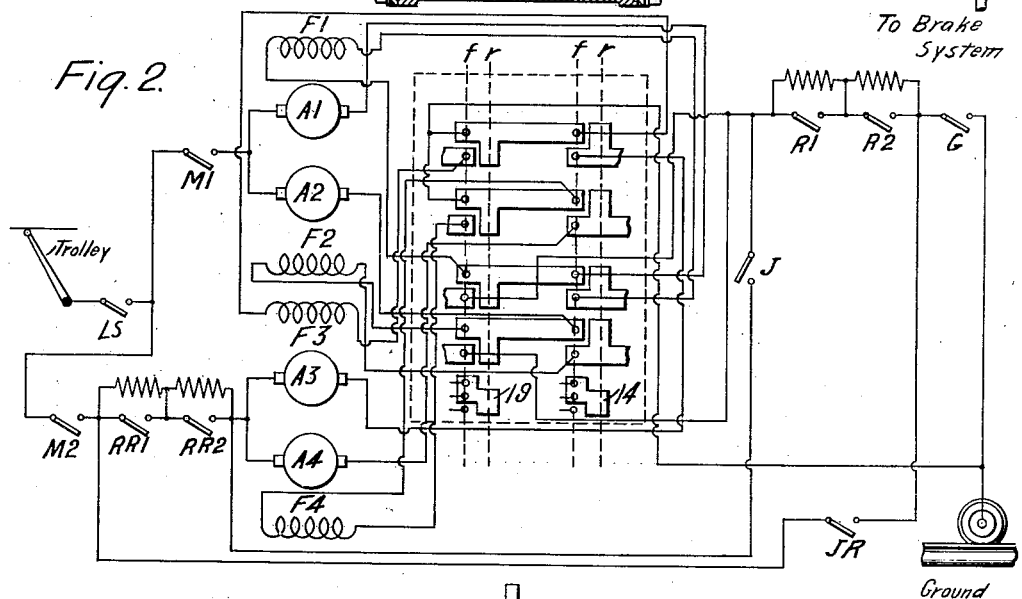
Figure 3:
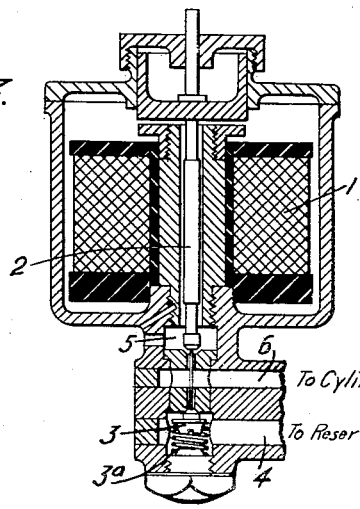

In the accompanying drawings, Figure 1 is a diagrammatic view of an auxiliary apparatus constructed in accordance with my invention; Fig. 2 is a diagrammatic view of the main circuits of a system of control adapted for employment in my invention; Fig. 3 is a sectional detail view of a portion of the apparatus shown in Fig. 1; and Fig. 4 is a diagrammatic view of the auxiliary control circuits for operating the various motor-controlling switches illustrated in Fig. 2, in accordance with the sequence chart of Fig. 5, which is of well-known form.

Referring to Fig. 1 of the drawing, the apparatus here shown comprises a suitable source of energy such as a control resistor CR of a familiar type for supplying the auxiliary control circuits shown in Fig. 4; a plurality of control switches CS1 and CS2 which are preferably located at the respective ends of the vehicle for opening and closing the circuits between the control resistor and the master controller of Fig. 4; a fluid-pressure operated main circuit reverser RS, preferably of the drum type, which is adapted for normal operation in the one or the other direction by electrically-controlled valves NV1 and NV2 of a construction hereinafter described; one or more tanks or reservoirs T for supplying fluid pressure; a pipe or conduit N that is employed during normal operation of the reverser; a plurality of auxiliary valves AV1 and AV2, preferably located at the respective ends of the vehicle, for operating the reversing switch RS under emergency conditions; and a plurality of pipes or conduits E1 and E2 for respectively connecting the valve AV1 and the valve AV2 to the operating cylinder of the reverser.

The operation of the apparatus shown in Fig. 1, without regard to the electrical circuit changes effected thereby, may be described as follows:

When it is desired to dynamically brake the vehicle, either the valve AV1 or the valve AV2, as the case may be, according to the direction of travel of the vehicle, is actuated to admit fluid pressure from the tank T through a suitable check valve CV to the operating cylinder of the reversing switch RS, which is thus thrown to its reverse position.

For normal operation of the reverser, either the valve NV1 or the valve NV2 is electrically actuated, in a manner hereinafter set forth in connection with Fig. 3.

Referring now to Fig. 2 of the drawing, the main circuits here shown comprise a supply circuit conductor marked "Trolley"; a return circuit conductor, such as a track rail, marked "Ground"; a plurality of electric motors respectively provided with armatures A1, A2, A3 and A4 and field windings F1, F2, F3 and F4; a plurality of motor-controlling switches LS, M1, M2, JR, J and G, including resistor short-circuiting switches R1 and R2, RR1 and RR2; and the reversing switch RS which is adapted to simultaneously reverse the electrical relations of all of the field windings with respect to the corresponding armatures, in accordance with well-known practice. It should be noted that the motors are permanently connected in parallel related pairs, thus providing a closed circuit which is adapted, without further circuit arrangement, for dynamic braking, as will be understood. The motors are preferably mounted on a railway vehicle of any suitable type, in the usual manner, which, for purposes of simplicity, is not specifically shown.

Referring now to Fig. 4, the auxiliary control circuits illustrated comprise the control resistor CR, suitable master controllers MC, which are preferably located at the respective ends of the vehicle, and are severally adapted to occupy a plurality of motor-controlling positions $a$ to $g$, inclusive; correspondingly-located master reversers MR, which are severally adapted to occupy an "off", a "forward" and a "reverse" position; the control switches CS1 and CS2; a plurality of magnet coils for respectively operating the various motor-controlling switches shown in Fig. 2; and a plurality of train-line conductors TL for connecting the master controllers MC to the several magnet coils in one or more associated vehicles.

The electrically-governed, fluid-pressure controlled switches which are employed in the control system illustrated are preferably of the construction shown in Fig. 3, and comprise essentially an energizing coil 1, which is adapted to electro-magnetically actuate a centrally-disposed magnetizable core 2, to the lower end of which a suitable valve member 2 is attached and is biased by a suitable spring $3^a$ to close a passage 4 from the tank or reservoir T. An exhaust chamber 5 normally communicates with a second passage 6 which leads to the fluid-pressure operated cylinder, of any well known type, for closing the switch. When the coil 1 is energized, the core 2 and valve 3 are actuated to admit fluid pressure from the passage 4 to the passage 6 and to close communication between the passage 6 and exhaust chamber 5. Although all of the switches illustrated in connection with my system of control are preferably of the type just described, it will be understood that, with the exception of the reversing switch valves marked "NV1" and "NV2", any other suitable type of switches may be employed in my invention.

Assuming the various circuit connections to be as shown in Figs. 2 and 4, the operation of the control systems illustrated may be briefly described as follows: Energy is supplied from the control resistor CR to the control switch CS1 or the control switch CS2, as the same may be, to the corresponding controller MC when it has been moved to its initial position and thence, through conductor 11, contact member 12 of the master reverser, conductor 13, interlocking contact member 14 of the main circuit reverser RS, conductor 15 and the actuating coil of the switch LS to the conductor 16, which is connected to the negative side of the control resistor CR. In like manner, the switches M1 and JR are energized directly from the master controller, thereby completing a series connection of the parallel-connected pairs of motors with all of the accelerating resistors.

As the controller is moved successively to its positions $b$ and $c$, the resistor short-circuiting switches R1, R2, RR1 and RR2 are closed, in a well-known manner, to gradually accelerate the motors. The transition of the pairs of motors from series to parallel relation is accomplished by the well-known "bridging" form of transition in which, as indicated in the sequence chart of Fig. 5, switch J is first closed to short circuit all of the resistor sections, switches JR and R1 to RR2, inclusive, are opened, switches M2 and G are next closed, and switch J is then opened, the then circuit condition corresponding to the position $e$ of the master controller. In positions $f$ and $g$ of the controller, the various resistor short-circuiting switches are again actuated in the manner similar to that hereinbefore described, and the pairs of motors are disposed in full parallel relation, when the master controller assumes its position $g$.

In case it is desired to dynamically brake the vehicle when the supply circuit voltage is available, it is only necessary to throw the master reverser MR to its reverse position $r$ when, provided the master controller MC is momentarily moved to its first operative position $a$, a circuit is completed from the conductor 11 through contact member 17 of the master reverser, conductor 18, interlocking contact member 19 of the main-circuit reverser and the actuating coil of the magnet valve NV2. The main-circuit reverser is thus thrown to its reverse position and dynamic braking will thereupon be set up when the master controller is returned to its "off" position. However, in case the supply circuit voltage has failed or it is impossible to conduct current to the magnet valve NV1 or the valve NV2 for any other reason, it will be appreciated that such actuation of the main-circuit reverser is impossible. In such an emergency, either the auxiliary valve AV1 or the valve AV2, as the case may be, is actuated to accomplish the reversing of the field windings in the manner hereinbefore described. Simultaneously with the operation of the auxiliary valve, a cam surface 21 (Fig. 1) of the auxiliary valve employed engages a rod or other suitable movable member 22 to cause a separation of the movable member 23 of the corresponding control switch from its coöperating stationary contact member 24. In this way, if, in the excitement of the moment, or to save a little time, the train operator does not return his master controller to the "off" position, the disconnection of the motors from the supply circuit is effected. It will be understood that any other suitable means for opening the control switch, upon the manipulation of the auxiliary valve, may be employed. All of the motor-controlling switches, being thus deenergized, will open, provided they have not already opened by reason of the failure of supply-circuit voltage, and two sets of local braking circuits are provided in the vehicle, whereby it may readily be retarded or held at a safe speed when descending a grade, as will be understood.

I do not wish to be restricted to the specific arrangement of parts or structural details herein set forth, but desire that only such limitations shall be imposed as are indicated in the appended claims.

I claim as my invention:

1. In a system of control, the combination with a plurality of electric motors having armature and field windings, control means for varying the electrical relations of said armature and field windings, fluid-operated means for operating said control means to a forward or a reverse position and electrical means for normally governing the operation of said fluid-operated means, of auxiliary power-controlling means for effecting the operation of said fluid-operated means to reverse the position of said control means and set up dynamic braking when the motors are driven by their own momentum.

2. In a system of control, the combination with a plurality of electric motors provided with field windings and armatures forming a closed circuit, a supply circuit, main motor circuits and auxiliary control circuits connected to said supply circuit, and fluid-pressure-operated means normally employed for reversing the electrical relations of the field winding and the armature of each motor, of auxiliary fluid-pressure-controlling means for effecting the actuation of said first named means to set up dynamic braking when the motors are momentum driven and for substantially simultaneously breaking all of said motor circuit and said auxiliary control circuits.

3. In a system of control, the combination with a railway vehicle adapted to be driven by a plurality of electric motors provided with field windings and armatures and forming a closed circuit, a supply circuit, auxiliary motor control circuits connected to said supply circuit, and power-operated means normally employed for reversing the electrical relations of the field winding and armature of each motor, of auxiliary power-controlling means operative from a plurality of points in the vehicle for effecting the actuation of said first named means to set up dynamic braking when the motors are momentum driven and for substantially simultaneously breaking the auxiliary control circuits.

4. In a system of control, the combination with a railway vehicle adapted to be driven by a plurality of electric motors provided with field windings and armatures and forming a closed circuit, a supply circuit, auxiliary motor-control circuits connected to said supply circuit and fluid-pressure means normally employed for reversing the electrical relations of the field winding and the armature of each motor, of auxiliary fluid-pressure means operated from a plurality of points in the vehicle for effecting the actuating of said first named means to set up dynamic braking when the motors are momentum driven and for substantially simultaneously breaking the auxiliary control circuit.

5. In a system of control, the combination with a railway vehicle adapted to be driven by a plurality of electric motors provided with field windings and armatures forming a permanent closed circuit, fluid-pressure operated means normally employed for reversing the electrical relations of the field winding and armature of each motor, a source of fluid pressure, and a pipe or conduit normally employed for conducting fluid pressure from said source to said means, of auxiliary fluid-pressure controlling means, operative from the respective ends of the vehicle, and auxiliary pipes or conduits for connecting said auxiliary means to said first means for effecting the actuation thereof to set up dynamic braking when the motors are momentum driven.

6. In a system of control, the combination with an electric motor having armature and field windings, control means for varying the electrical relations of said field and armature windings, fluid-operated means for operating said control means to a forward or a reverse position and electrical means for normally governing the operation of said fluid-operated means, of auxiliary power-controlling means for effecting the operation of said fluid-operated means to reverse the position of said control means and set up dynamic braking when the motor is driven by its own momentum.

7. In a system of control, the combination with a supply circuit, a railway vehicle adapted to be driven by a plurality of electric motors provided with field windings and armatures forming a permanent closed circuit, main circuit resistors, a plurality of motor-controlling switches, including resistor short-circuiting switches, for effecting acceleration and normal operation of the motors, a plurality of actuating magnet coils for said switches, a controller for governing the energization of said coils, a switching device for connecting said supply circuit to said controller, and a fluid-pressure operated device for reversing the electrical relations of the field winding and armature of each motor, of auxiliary fluid-pressure controlling valves located at the respective ends of the vehicle for opening said switching device and for effecting the actuation of said fluid-pressure operated device to thereupon set up dynamic braking.

In testimony whereof, I have hereunto subscribed my name this 24th day of July, 1914.

CLARENCE RENSHAW.

Witnesses:
C. L. DAVIS,
B. B. HINES.